3,235,579
LINEAR CHLOROSILOXANES

Paul L. Brown, Saginaw, and James Franklin Hyde, Midland, Mich., assignors to Dow Corning Corporation, Midland, Mich., a corporation of Michigan
No Drawing. Filed May 25, 1964, Ser. No. 370,097
8 Claims. (Cl. 260—448.2)

This application is a continuation-in-part of application Serial Number 103,978, filed April 19, 1961, and now U.S. Patent 3,162,662, and entitled "Preparation of Linear Chlorosiloxanes From Cyclotrisiloxanes."

This invention relates to new linear chlorosiloxanes.

It is the object of this invention to provide new short-chain linear chlorosiloxanes.

Broadly, the compounds of this invention are prepared by interacting the appropriate silane or siloxane containing at least one silicon-bonded halogen atom per molecule with the appropriate diorganocyclotrisiloxane to produce the linear chlorosiloxane. A complete description of the process, including reactants and conditions, is set forth in the parent application, the disclosure of which is incorporated herein by reference.

The functionally active materials of this invention are useful, for example, as cross-linking agents in rubbers or resins. The halogen endblocked compounds of this invention are especially useful in the preparation of precise resinous and elastomeric polymeric structures.

In order that those skilled in the art can better understand how the present invention can be practiced, the following examples are given by way of illustration and not by way of limitation. The symbols, Me and Ph represent the methyl and phenyl radicals.

EXAMPLE 1

100 grams of hexamethylcyclotrisiloxane, 77 grams of tetrachlorosilane, 20 grams of acetonitrile and about one gram of dimethylformamide were mixed together in a closed system, i.e., a capped bottle, for one hour at room temperature. The product was distilled and was found to contain a good yield of $Cl_3Si(OSiMe_2)_3Cl$ (boiling point of 42° C. at 0.15 mm. Hg) verified by its infrared spectrum.

EXAMPLE 2

A mixture of 444 grams of hexamethylcyclotrisiloxane, 423 grams of monophenyltrichlorosilane, 78.3 grams of acetonitrile and 0.17 gram of dimethyl formamide was heated in a closed system at 70° C. for 72 hours. The resulting product was stripped of catalysts and any remaining chlorosilane at 135° C. and 2 mm. Hg pressure. The residue was a mixture of reaction products of the silane and cyclotrisiloxane consisting primarily of $$Cl_2SiPh(OSiMe_2)_3Cl$$

and $ClSiPh[(OSiMe_2)_3Cl]_2$ and containing 18.1 percent by weight chlorine.

EXAMPLE 3

A mixture of 222 grams of hexamethylcyclotrisiloxane, 94.5 grams of $Me_2HSiCl$, 39.1 grams of acetonitrile and 2.4 grams of dimethylformamide was stirred at room temperature for 68 hours after which infrared analysis showed at most a trace of hexamethylcyclotrisiloxane remaining in the reaction mixture. The product was a mixture of compounds of the general formula $$Me_2HSi(OSiMe_2)_xCl$$

in which $x$ has an average value of about 4.5. This indicates an approximately equal mixture of $$Me_2HSi(OSiMe_2)_3Cl$$

and $Me_2HSi(OSiMe_2)_6Cl$. The product was verified by mixing it with an excess of $Me_3SiCl$ and adding the mixture to a slurry of toluene, acetonitrile and sufficient ZnO to condense all the silicon-bonded chlorine. The product mixture was filtered, the filtrate washed and the washed filtrate stripped to 80° C. vapor temperature at 6 mm. of Hg. The product was 2.32 cs. fluid containing about 2.1 percent by weight silicon-bonded hydrogen. Infrared analysis showed approximately 18 percent by weight trimethylsiloxane units in the product. This corresponds to a product of the general formula $$Me_2HSi(OSiMe_2)_xOSiMe_3$$

in which $x$ has an average value of about 4.5.

EXAMPLE 4

When the following mixtures of cyclotrisiloxanes A and compounds B are each mixed with 30 parts by weight of acetonitrile and 0.5 part by weight of dimethylformamide and are allowed to stand at room temperature in a closed system for 115 hours, the identifiable product shown is produced showing that a reaction has taken place between A and B, whereby the cyclotrisiloxane A forms a linear siloxane polymer having attached to one terminal silicon atom a halogen atom from B and having attached to the other terminal silicon atom through a siloxane linkage the silicon atom of B from which the halogen atom separated.

Table I

| A | Parts by Wt. | B | Parts by Wt. | Product |
|---|---|---|---|---|
| $(CF_3CH_2CH_2SiMeO)_3$ | 66 | $CF_3CH_2CH_2SiCl_3$ | 16 | $CF_3CH_2CH_2SiCl_2[OSiMe(CH_2CH_2CF_3)]_3Cl$ |
| $(Me_2SiO)_3$ | 64 | $HSiCl_3$ | 10 | $HSiCl_2(OSiMe_2)_3Cl$ |
| $(CF_3CH_2CH_2SiMeO)_3$ | 67 | $SiCl_4$ | 25 | $Cl_3Si[OSi(CH_2CH_2CF_3)(Me)]_3Cl$ |

EXAMPLE 5

A mixture of 150 grams of methyltrichlorosilane, 111 grams of hexamethylcyclotrisiloxane, 15.7 grams of acetonitrile and 2.8 grams of dimethylformade was shaken for about 168 hours at room temperature and distilled. The principal product was $Cl_2SiMe(OSiMe_2)_3Cl$ having a boiling point of 50° C. at 0.3 mm. Hg.

That which is claimed is:

1. A linear chlorosiloxane selected from the group consisting of $Cl_3Si[OSi(CH_3)_2]_3Cl$
$Cl_2Si(CH_3)[OSi(CH_3)_2]_3Cl$
$Cl_2(CF_3CH_2CH_2)Si[OSi(CH_2CH_2CF_3)(CH_3)]_3Cl$
$Cl_3Si[OSi(CH_2CH_2CF_3)(CH_3)]_3Cl$
$(CH_3)_2SiH[OSi(CH_3)_2]_3Cl$
$Cl_2SiH[OSi(CH_3)_2]_3Cl$ and $Cl_2Si(C_6H_5)[OSi(CH_3)_2]_3Cl$ 2. $Cl_3Si[OSi(CH_3)_2]_3Cl$.
3. $Cl_2Si(CH_3)[OSi(CH_3)_2]_3Cl$.
4. $Cl_2(CF_3CH_2CH_2)Si[OSi(CH_2CH_2CF_3)(CH_3)]_3Cl$.
5. $Cl_3Si[OSi(CH_2CH_2CF_3)(CH_3)]_3Cl$.

6. 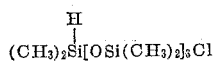

7. 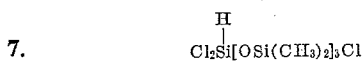

8. 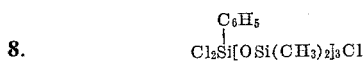

References Cited by the Examiner

UNITED STATES PATENTS

| | | | |
|---|---|---|---|
| 2,381,366 | 8/1945 | Patnode | 260—448.2 |
| 2,421,653 | 6/1947 | Sauer | 260—448.2 |
| 2,519,881 | 8/1950 | Brewer | 260—448.2 |
| 2,902,507 | 9/1959 | Hyde et al. | 260—448.2 |
| 2,911,427 | 11/1959 | Brown | 260—448.2 |
| 2,981,746 | 4/1961 | Cohen et al. | 260—448.2 |
| 3,065,252 | 11/1962 | Brown et al. | 260—448.2 |
| 3,101,361 | 8/1963 | Brown et al. | 260—448.2 |

FOREIGN PATENTS 1,030,346   5/1958   Germany.

OTHER REFERENCES

Andrianov et al.: "Doklady Akad. Nauk. SSSR," vol. 134, October 1960, pp. 1347–9 (55 Chem. Abstracts 9264d).

Andrianov et al.: "Izvestia Akad. Nauk. SSSR," August 1961, pp. 1456–61 (56 Chem. Abstracts 494c).

Daudt et al.: J.A.C.S., vol. 74, 1952, pp. 386–90.

Eaborn: "Organosilicon Compounds," Academic Press, Inc., New York (1960), pp. 230–1.

TOBIAS E. LEVOW, *Primary Examiner.*